Aug. 21, 1962  R. J. PSCHUNDER  3,050,005
ENGINE
Filed April 28, 1958  4 Sheets-Sheet 1
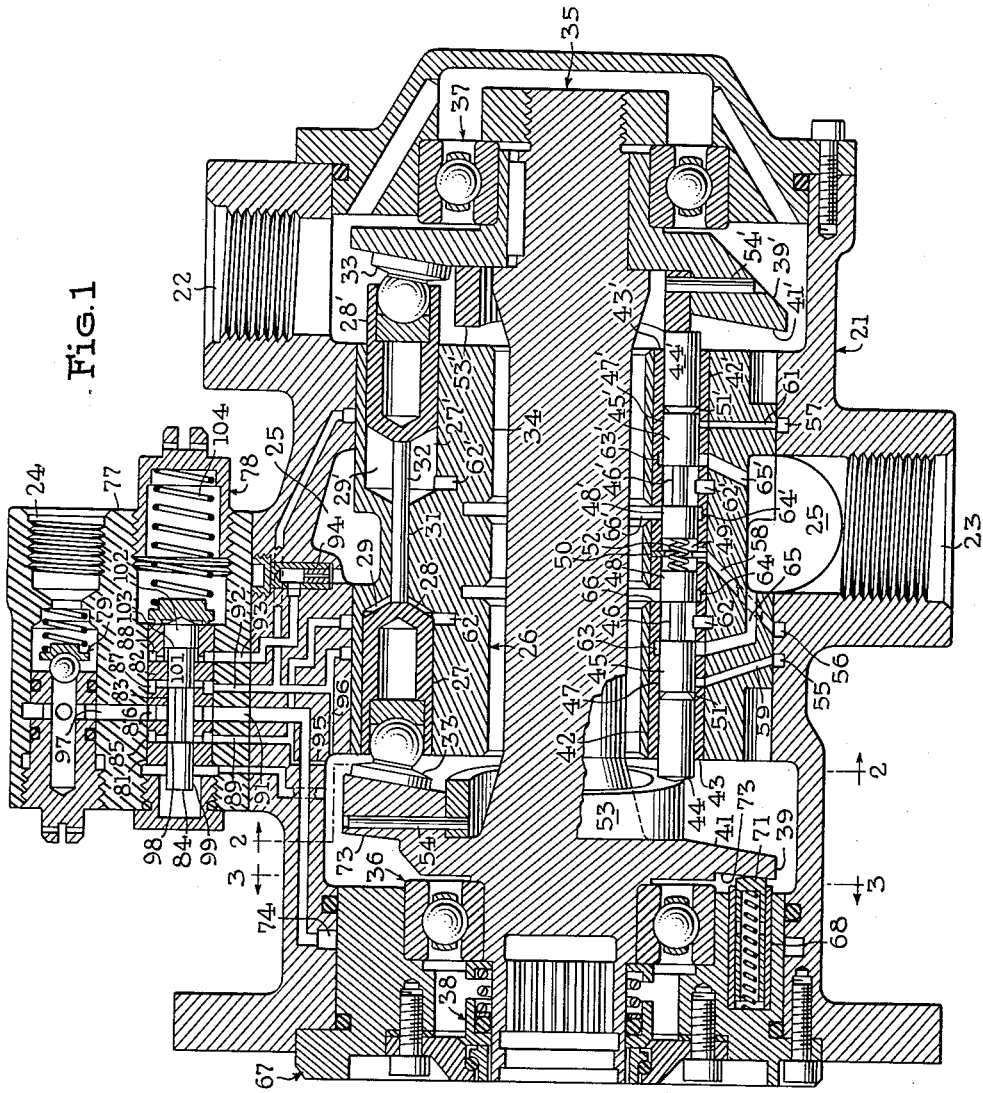
INVENTOR
Ralph J. Pschunder
BY Dodge and Sons
ATTORNEYS Aug. 21, 1962   R. J. PSCHUNDER   3,050,005
ENGINE
Filed April 28, 1958   4 Sheets—Sheet 2

INVENTOR
Ralph J. Pschunder
BY Dodge and Sons
ATTORNEYS

Aug. 21, 1962   R. J. PSCHUNDER   3,050,005
ENGINE
Filed April 28, 1958   4 Sheets-Sheet 3

INVENTOR
Ralph J. Pschunder
BY Dodge and Sons
ATTORNEYS

Aug. 21, 1962 R. J. PSCHUNDER 3,050,005
ENGINE
Filed April 28, 1958 4 Sheets-Sheet 4
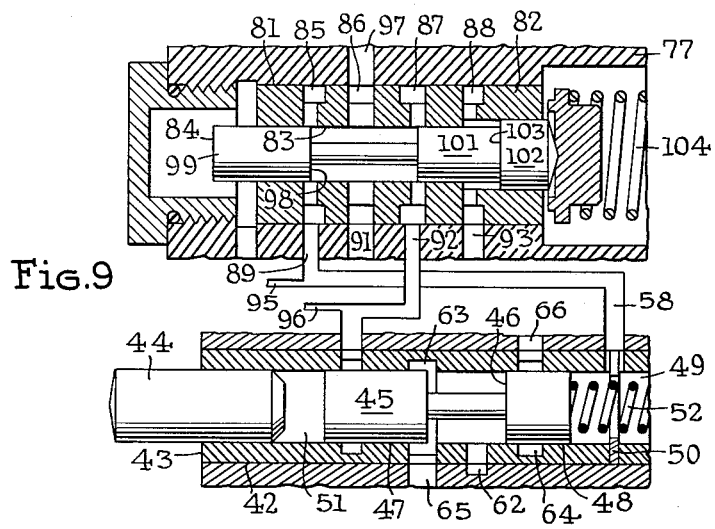
Fig. 9
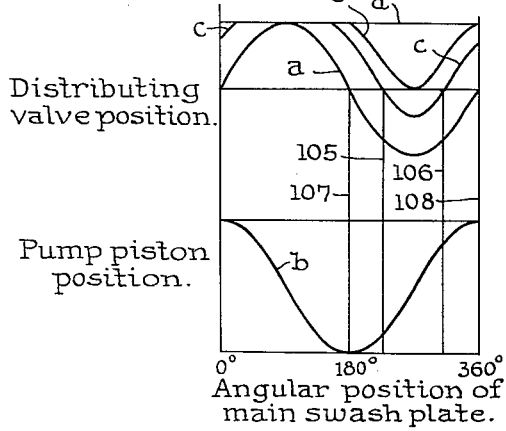
Fig. 10
Distributing valve position.
Pump piston position.
Angular position of main swash plate.
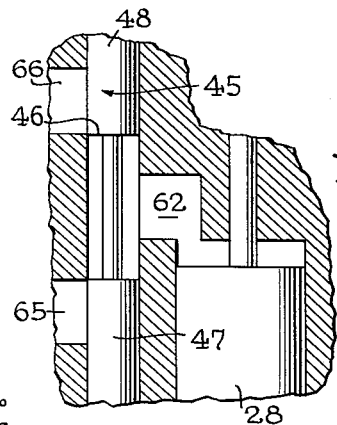
Fig. 11
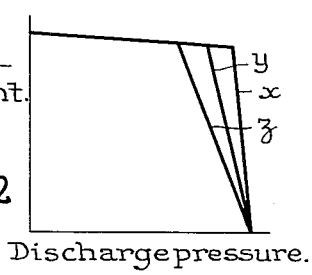
Fig. 12
Pump displacement.
Discharge pressure.
Fig. 13
Pump displacement.
Discharge pressure.
INVENTOR
Ralph J. Pschunder
BY Dodge and Sons
ATTORNEYS United States Patent Office 3,050,005
Patented Aug. 21, 1962

1

3,050,005
ENGINE
Ralph J. Pschunder, Watertown, N.Y., assignor to The New York Air Brake Company, a corporation of New Jersey
Filed Apr. 28, 1958, Ser. No. 731,269
13 Claims. (Cl. 103—37)

This invention relates to fluid pressure engines and more particularly to engines of the reciprocating piston type in which the pistons are moved on their discharge strokes by a rotary cam plate. The term engine is used here in its generic sense and includes pumps as well as motors. However, in the interest of clarity, the following discussion will deal only with pumps.

In these pumps, which can include one or more pistons, the pistons and the cylinder bores in which they reciprocate cooperate to define pump working chambers. Each working chamber must be provided with a valve for controlling the flow of fluid into and out of the chamber. Up till now, two valve arrangements have been used extensively. In one, each working chamber is provided with an inlet passage and a discharge passage. Each passage contains a spring-biased check valve and the valves are reversely set so that fluid enters the chamber through the inlet passage and leaves the chamber through the discharge passage. In the other, the inlet check valve is eliminated and the inlet passage is so located that it intersects the cylinder bore and forms a port which is overtravelled and sealed by the piston as it moves on its discharge stroke. Neither arrangement is entirely satisfactory. The first is inherently inefficient because the inlet flow is restricted. The second arrangement is inefficient because the piston is under pressure, and consequently is doing work, for less than half its stroke. Both arrangements are subject to the disadvantage that they are not easily adaptable to variable displacement operation.

The object of this invention is to provide a valve arrangement for these pumps which affords a 180° pumping stroke at full flow and which can decrease this stroke progressively to afford variable displacement operation. According to the invention, each working chamber is provided with a distributing valve which is shiftable between first and second positions in which it connects the working chamber with the inlet passage and with the discharge passage, respectively. In moving from the first to the second position, the valve closes progressively the connection between the working chamber and the inlet passage and then opens progressively the connection between this chamber and the discharge passage. During maximum displacement operation, the valve is oscillated between these positions in timed relation to the reciprocation of its associated pump piston so that for one-half of the pumping cycle, i.e., the inlet stroke, the working chamber is connected with the inlet passage and for the other half, i.e., the discharge stroke, it is connected with the discharge passage. Reduction of effective displacement is achieved by retarding the oscillation of the distributing valve in such a way that the working chamber is connected with the inlet passage for a greater portion of the pumping cycle. This retardation is effected in a progressive manner and therefore gradual variation in effective displacement is afforded.

The preferred embodiment of the invention will now be described in relation to the accompanying drawings, in which:

FIG. 1 is an axial section of an opposed piston pump incorporating the invention.

2 showing the geometrical arrangement of the three by-pass pumps and their check valves.

Figure 3:
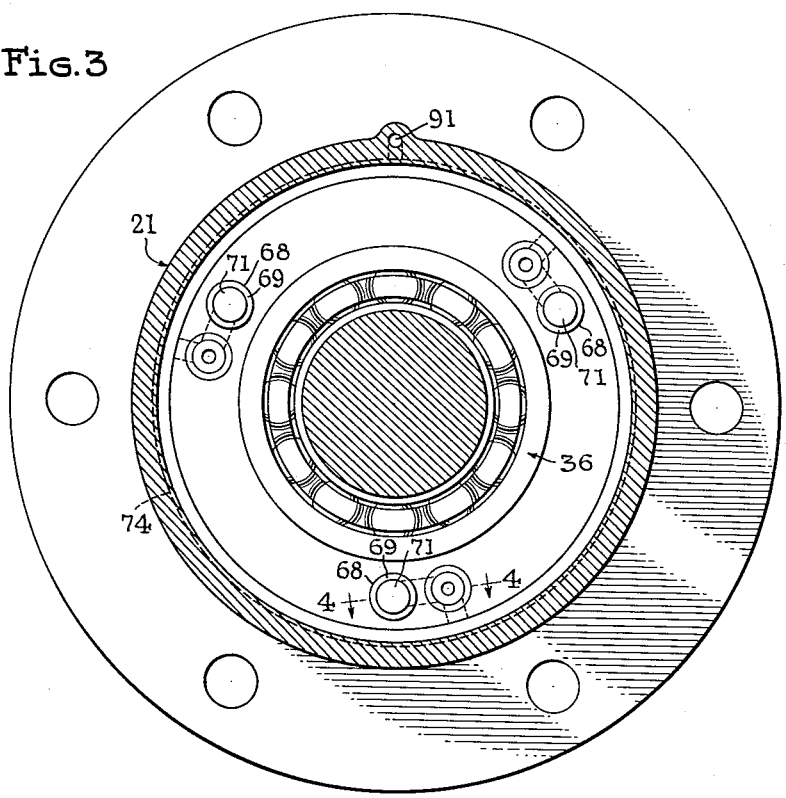
FIG. 3 is a sectional view taken on line 3—3 of FIG. 1

FIG. 4 is an enlarged sectional view taken on line 4—4 of FIG. 3 showing the connection between one by-pass pump and its check valve.

FIG. 5 is a sectional view taken on line 5—5 of FIG. 4 showing one by-pass pump check valve.

Figure 6:
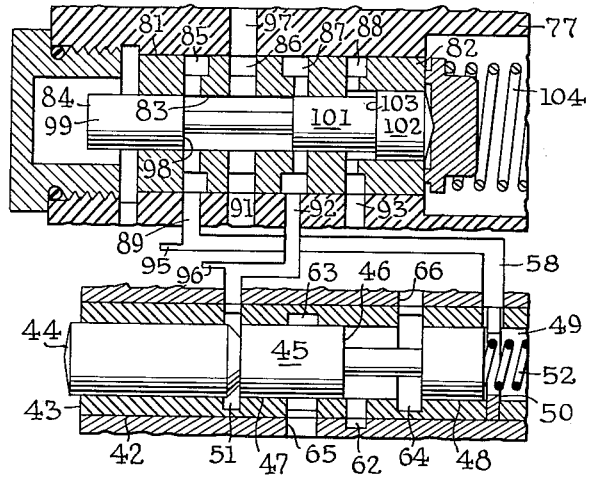

FIG. 6 is a diagrammatic view of the control valve, a valve plunger and one of the distributing valves; the control valve being shown in its maximum displacement establishing position, the plunger being shown in its innermost position, and the distributing valve being shown in its innermost position.

Figure 7:
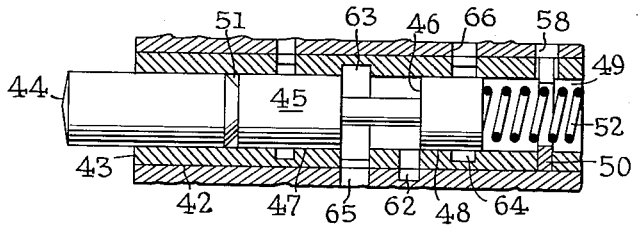

FIG. 7 is a diagrammatic view of a valve plunger and a distributing valve; the plunger being shown in its outermost position and the distributing valve being shown in the position it occupies when the valve plunger is in this position and the control valve is in its FIG. 6 position.

Figure 8:
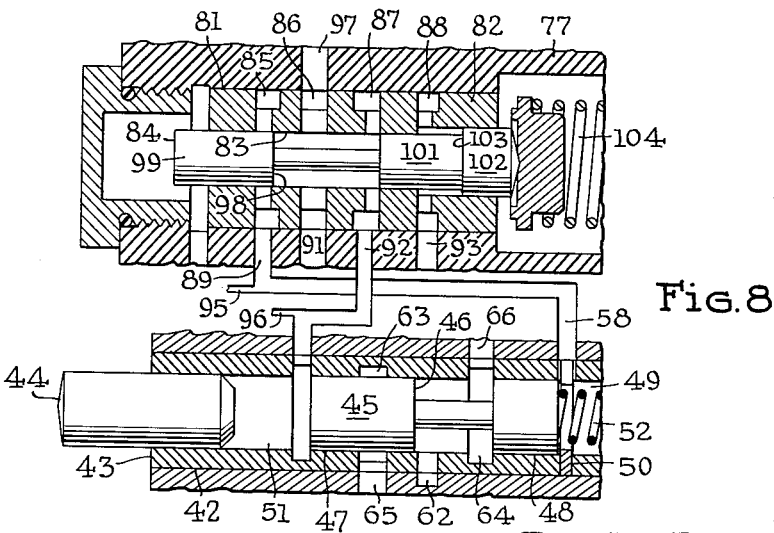

FIG. 8 is a diagrammatic view similar to FIG. 7, showing the position the distributing valve occupies when the valve plunger is in its outermost position and the control valve is in its zero displacement establishing position.

FIG. 9 is a diagrammatic view similar to FIGS. 7 and 8, showing the position the distributing valve occupies when the valve plunger is in its outermost position and the control valve is in a position intermediate its maximum and zero displacement establishing positions.

FIG. 10 is a graph showing the relationship between the strokes of the pump piston and its associated distributing valve for various positions of the control valve.

FIG. 11 is a diagrammatic view of a distributing valve and its associated pump piston to be used in conjunction with the graph of FIG. 10.

FIG. 12 is a graph showing various relationships between pump displacement and discharge pressure.

FIG. 13 is a graph similar to FIG. 12 showing the pump displacement-discharge pressure relationship for a modified form of the invention.

Referring to FIG. 1, the pump comprises a housing 21 formed with inlet and discharge ports 22 and 23, and a by-pass port 24. The discharge port 23 communicates with an annular groove 25 encircling a cylinder block 26 which is pressed into a bore formed in the housing. The cylinder block 26 contains two circular series of aligned longitudinal cylinder bores 27 and 27'. Pump pistons 28 and 28' reciprocate in the bores of series 27 and 27', respectively, and define, with the inner closed ends of these bores, a plurality of pump working chambers 29 and 29'. A piston plunger bore 31 is aligned with and extends between aligned pairs of cylinder bores 27, 27'. Piston plungers 32 reciprocate in these bores. These piston plungers 32 abut the inner ends of pump pistons 28 and 28' and are of such length as to maintain the pistons in operative engagement with the main swash plates (described below). A piston shoe 33 is mounted for universal movement on the outer end of each pump piston 28, 28'.

Extending through, but radially spaced from, an axial bore 34 formed in cylinder block 26, is a drive shaft 35. The drive shaft 35 is journalled in bearings 36 and 37 on opposite sides of the cylinder block 26 and is provided with a conventional running seal 38 at its left end. Carried by the drive shaft 35 are two main swash plates 39 and 39'; the former being formed integrally with the shaft and the latter being splined to it, as shown. The cam faces 41 and 41' of the main swash plates lie in parallel planes and are in sliding engagement with piston shoes 33.

Coaxial with the two series of cylinder bores 27 and 27' are two similar series of valve plunger bores 42 and 42'; there being the same number of bores in these series as in the series 27, 27'. Pressed into valve plunger bores 42, 42' are ported valve sleeves 43, 43' which receive reciprocable valve plungers 44, 44' and distributing valves 45, 45'. Mounted between the inner end faces of the sleeves 43 and 43' are split elastic rings 50 which serve as limit stops for the distributing valves 45, 45'. The distributing valves 45, 45' are formed with annular grooves 46, 46' which define valve lands 47, 48 and 47', 48', respectively. The end faces of valve lands 47, 47', 48 and 48' constitute motor pistons and the spaces between lands 48 and 48' and between lands 47 and 47' and valve plungers 44, 44' constitute motor working chambers 49, 51 and 51'. Distributing valves 45, 45' are biased outward into abutment with valve plungers 44, 44' by coil springs 52 and the valve plungers 44, 44' are urged inward by auxiliary swash plates 53, 53'. These auxiliary swash plates are secured to drive shaft 35 by taper pins 54, 54'. The auxiliary swash plates 53, 53' and valve plunger bores 42, 42' are so positioned relatively to the main swash plates 39, 39' and the cylinder bores 27, 27' that the reciprocation of each distributing valve 45, 45' is 90° out of phase with the reciprocation of the associated pump piston 28, 28'.

Formed in housing 21 and encircling cylinder block 26 are three longitudinally spaced annular grooves 55, 56 and 57; the groove 56 being connected by passages 58 with the working chambers 49 formed by the inner ends of each pair of aligned distributing valves 45, 45'. Passages 59 and 61 connect the grooves 55 and 57, respectively, with the interior of the valve sleeves 43, 43' and with working chambers 51 and 51' when the distributing valves 45, 45' are in their innermost positions.

Figure 2:
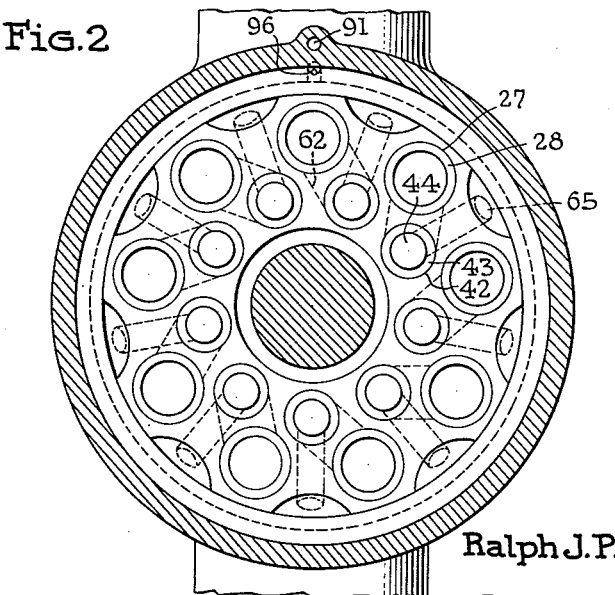
FIG. 2 is a sectional view taken on line 2—2 of FIG. 1 showing one circular series of pump pistons and its associated series of valve plungers.

The interior of each of the valve sleeves 43, 43' is connected with one of the pump working chambers 29, 29' by passages 62, 62' (see FIG. 2). The sleeves also contain two spaced annular chambers 63, 64 and 63', 64' which are connected with annular discharge groove 25 and axial bore 34, respectively, by passages 65, 65' and 66, 66'. Communication between passages 62, 65 and 66 and between passages 62', 65' and 66' is controlled by distributing valves 45 and 45' in the manner discussed below.

Formed in end block 67, secured to and closing the left end of housing 21, are three equiangularly spaced by-pass pump plunger bores 68 (see FIGS. 1 and 3). Each of these bores is fitted with a liner 69 in which reciprocates a by-pass pump plunger 71. The plungers 71 contain inlet ports 72 and their outer ends are in engagement with a cam face 73 formed on the left side of main swash plate 39. This cam face 73 is in phase with main cam face 41. Each by-pass pump plunger bore 68 communicates with annular groove 74 through a check valve 75. The by-pass pump plungers are biased into contact with swash plate 39 by springs 76.

Mounted on top of housing 21 (as viewed in FIG. 1) is a valve housing 77 containing a control valve 78 and a relief valve 79. Formed in the housing 77 is a bore 81 into which is pressed a ported control valve sleeve 82 having a bore 83 which receives control valve plunger 84. Spaced along the valve sleeve 82 are four annular grooves 85, 86, 87 and 88 which communicate with bore 83 through radial passages, as shown. Passages 89, 91, 92 and 93 connect the sleeve grooves 85, 86, 87 and 88 with the annular grooves 56, 74, 55 and 25, respectively, formed in pump housing 21. Flow restrictor 94 is located in passage 93 and restricted passages 95 and 96 connect passages 89 and 92, respectively, with the interior of the pump housing. Sleeve groove 86 is also connected with by-pass port 24 by passage 97. The relief valve 79 is located in passage 97 for limiting the pressure developed by by-pass pump plungers 71.

The control valve plunger 84 is formed with an annular groove 98 which defines two spaced valve lands 99 and 101. Plunger 84 also has an enlarged land 102 which fits the enlarged right end of valve bore 83. Between lands 101 and 102 is a shoulder 103 which serves as the piston of a control motor. A coil spring 104 biases the control valve plunger 84 to the position shown in FIG. 1.

*Operation*

In operation, discharge port 23 is connected with an hydraulic system, and inlet port 22 and by-pass port 24 are connected with a sump. As drive shaft 35 is rotated, main swash plates 39 and 39' cause pistons 28 and 28' to reciprocate, and auxiliary swash plates 53 and 53', acting through valve plungers 44 and 44', cause reciprocation of distributing valves 45 and 45'. As shown by curves *a* and *b* in FIG. 10, these reciprocations are 90° out of phase. When a pump piston 28 is moving outward on its suction stroke, the associated distributing valve 45 opens communication between passages 62 and 66 through plunger groove 46 and annular chamber 64. Fluid entering inlet port 22 flows to the expanding pump working chamber 29 through the radial clearance between shaft 35 and axial bore 34, passage 66, annular chamber 64, annular groove 46, and passage 62.

When the pump piston reaches its outermost or bottom dead-center position, valve land 48 closes communication between passages 62 and 66. As the pump piston 28 begins to move inward on its discharge stroke, the associated distributing valve continues to move outward causing valve land 47 to uncover annular chamber 63. Pressure fluid is forced out of pump working chamber 29 and is transmitted to discharge port 23 via passage 62, annular groove 46, annular chamber 63, passage 65, and annular groove 25. When the pump piston 28 reaches its innermost or top dead-center position, the distributing valve will be moving inward and valve land 47 will interrupt communication between passages 62 and 65. A moment's consideration of curves *a* and *b* of FIG. 10 and the diagrammatic structure of FIG. 11 will make this valving action abundantly clear.

Pump pistons 28' and distributing valves 45' function in the same manner but the reciprocations of these pistons and valves is 180° out of phase with their aligned counterparts.

The cam face 73 of main swash plate 39 together with springs 76 cause reciprocation of by-pass pump plungers 71. When these plungers move outward under the bias of springs 76, fluid in the interior of pump housing 21 flows into the plunger bores 68 through the inlet ports 72. When the plungers 71 are moved inward by cam face 73, these ports 72 overtravel and are closed by liner 69 and the fluid within the bores is discharged through check valves 75 into annular groove 74. The pumping cycles of by-pass plungers 71 are 120° out of phase with each other but the strokes of these plungers are so selected that pressure pulsations are minimized. The by-pass fluid is transmitted to bore 83 of control valve 78 by passage 91 and annular chamber 86.

Pressure fluid in annular discharge chamber 25 is conveyed to the bore 83 of control valve 78 via restriction 94, passage 93, and annular chamber 88. This fluid acts upon control motor piston 103 for moving valve plunger 84 to the right against the bias of spring 104. At low discharge pressure, the control valve 78 is in the FIG. 6 position in which annular groove 98 permits free communication between annular chambers 85 and 86 and valve land 101 blocks flow to annular chamber 87. A part of hte output of the by-pass pump plungers 71 is thus transmitted to passage 89 from whence it flows into the interior of the housing 21 through restricted passage 95. The back pressure imposed on this fluid by the restricted passage 95 is transmitted to motor working chambers 49 through annular groove 56 and passages 58 where it acts upon the inner end faces of valve lands 48 and 48' in aid of springs 52 to urge the distributing valves 45 and 45' outward into abutment with valve plungers 44 and 44'. The distributing valves, therefore, move in accordance with curve *a* of FIG. 10 and alternately connect the associated piston working chambers with the inlet and discharge ports 22 and 23 as shown in FIGS. 6 and 7, respectively.

When discharge pressure rises above a preselected limit, the pressure in control valve bore 83 acting on control motor piston 103 shifts the valve plunger 84 to the right against the bias of spring 104 to a position such as the one shown in FIG. 9. Valve lands 99 and 101 now permit restricted communication between annular chamber 86 and each of the annular chambers 85 and 87. A portion of the output of by-pass pump plungers 71 passes through each of the passages 89 and 92 and flows into the interior of housing 21 through restricted passages 95 and 96. Since the flow into passage 89 is now less than when the control valve 78 was in its FIG. 6 position, the back pressure developed by restricted passage 95 and effective in motor working chambers 49 is reduced. The back pressure developed by restricted passage 96 is transmitted to annular grooves 55 and 57 and passages 59 and 61. When distributing valves 45 and 45' are moved to their innermost positions by auxiliary swash plates 53 and 53' and valve plungers 44 and 44' (see FIG. 6), the pressures in passages 59 and 61 are conveyed to motor working chambers 51 and 51'. The pressure in these working chambers 51 and 51' act against the outer ends of valve lands 47 and 47' to hold the distributing valves 45 and 45' in their innermost positions against the bias of springs 52 and the fluid pressure in motor working chambers 49, and also act against the inner ends of valve plungers 44 and 44' to urge these plungers outward into contact with their respective auxiliary swash plates. As the auxiliary swash plates rotate to allow the valve plungers 44 and 44' to move outward, the volumes of motor working chambers 51 and 51' increase. This action reduces the pressures in these working chambers and when the force exerted against the outer ends of the valve lands 47 and 47' becomes less than the bias of spring 52 and the force exerted by the fluid pressure in motor working chamber 49, the distributing valves 45 and 45' will commence to follow the outward movement of valve plungers 44 and 44'. When valve plungers 44 and 44' reach their outermost positions, the distributing valves 45 and 45' will have moved to the position shown in FIG. 9. When the valve plungers 44 and 44' are moved inward by the auxiliary swash plates, the distributing valves will move with them and the volumes of working chambers 51 and 51' will remain unchanged. However, when these working chambers 51 and 51' again come into communication with the passages 59 and 61, respectively, the fluid in the working chambers will be discharged and the valve plungers 44 and 44' will move into abutment with the distributing valves. These parts will then be in the position shown in FIG. 6.

It is thus seen that with the control valve in its FIG. 9 position, the oscillations of the distributing valves are retarded so that the pump working chambers 29 and 29' are in communication with inlet port 22 for more than half of their pumping cycles. The effect of this is to reduce the effective displacement of the pump because a portion of the fluid discharged from the pump working chambers passes into the pump housing 21. The motion of the distributing valves under these conditions is represented by the curve $c$ of FIG. 10. From this figure it can be seen that the pump pistons are under load and thus are discharging pressure fluid to discharge port 23 only when the swash plate moves between the positions designated 105 and 106. During maximum displacement operation, the pump pistons are pressurized for the full 180° as the swash plate moves between positions designated 107 and 108. This arrangement has the advantage that the pistons and hence the drive shaft bearings 36 and 37 are loaded in proportion to the displacement of the pump. In this way pump efficiency is improved.

As discharge pressure continues to increase, the control valve 78 will eventually be shifted to its FIG. 8 position wherein valve land 99 interrupts flow to annular chamber 85 and annular groove 98 establishes free communication between annular chambers 86 and 87. The pressure in motor working chamber 49 is now bled off through restricted passage 95 and thus is a minimum. Because of the increase of flow through restricted passage 96, the back pressure in passage 92, annular chambers 55 and 57, and passages 59 and 61 increases thereby increasing the pressures in motor working chambers 51 and 51'. This increased pressure differential across distributing valves 45 and 45' is high enough to hold these valves in their innermost positions against the bias of spring 52 regardless of the outward movement of valve plungers 44 and 44'. Thus when the valve plungers move to their outermost positions, the distributing valves remain in the position shown in FIG. 8. The pump working chambers are in continuous communication with the inlet port 22 and the effective displacement of the pump is zero. The curve $d$ of FIG. 10, which is a straight horizontal line, represents the motion of the distributing valves under this condition.

It should be observed that at some position of the control valve plunger 84 between the positions of FIGS. 8 and 9, the pressure differential across the distributing valves will be sufficient to prevent the annular grooves 46 and 46' of the distributing valves from interconnecting passages 62, 62' with annular chambers 63, 63' but not high enough to maintain these valves in their FIG. 8 position. Under these conditions, the valves will have the motion represented by curve $e$ of FIG. 10 but the effective displacement of the pump will be zero because the working chambers 29 and 29' are in continuous communication with the inlet port 22. Therefore, as the control valve shifts from this position to the FIG. 8 position, the effective displacement of the pump is unchanged.

As discharge pressure decreases, the force exerted by control motor piston 103 decreases and spring 104 shifts valve plunger 84 to the left. This action causes valve lands 99 and 101 to open and close progressively the communications between passages 89 and 91 and between passages 91 and 92, respectively, and thus increase the pressures in working chambers 49 and decrease the pressures in working chambers 51, 51'. As a result, the retardation of the oscillation of distributing valves 45, 45' is reduced and the effective displacement of the pump is increased.

It should be understood that the opposite ends of each distributing valve 45, 45', the associated working chambers 49 and 51 or 51', and the mechanism for transmitting variable pressures to these working chambers constitute override means for holding the distributing valve in the position of FIG. 8 for a period of time whose length varies progressively between limits corresponding to minimum and maximum portions of the discharge stroke of the associated piston 28. An inspection of FIG. 10 also will show that the override means simultaneously varies, in inverse relation to the length of that period, the distance the distributing valve is shifted from its FIG. 8 position by the plunger 44 or 44' and spring 52 after the period has terminated.

This type of control, namely regulating discharge pressure by varying displacement, is in common use today. As discharge pressure increases up to a certain limiting value, the displacement remains substantially constant at its maximum value. As discharge pressure increases from this limiting value to the desired maximum, the displacement is reduced progressively to a minimum. For optimum performance, the discharge pressure differential required to effect this complete shut down of the pump must be small. The present invention is particularly useful in this regard because the pressure differential depends only on the pressures in the motor working chambers 49 and 51, 51' and the rates of springs 52. The inertia of the distributing valve components is low so that high response characteristics are afforded. The curves of FIG. 12 show displacement versus discharge pressure characteristics for typical pumps embodying this invention; the curves $x$, $y$ and $z$ representing the various discharge pressure differentials which can be achieved by varying the rates of springs 52 and the relative values of the pressures in working chambers 49, 51 and 51′.

In some cases, system leakage is such that the pump must always deliver some fluid in order to maintain system pressure at a high value. This means that all of the pistons are under load for a portion of their pumping cycles. According to the present invention, the energy required to perform this function is reduced by replacing one of the springs 52 with a spring having a higher rate. In this way, one aligned pair of pump pistons would supply the leakage requirement and only this pair would be loaded. The displacement versus discharge pressure curve for this arrangement is shown in FIG. 13.

The by-pass pump plungers 71, in addition to supplying the motive fluid for retarding the oscillations of the distributing valves, also serve to circulate fluid through the housing for the purpose of cooling the pump. It will be apparent that pressure fluid for both of these functions could be obtained from the discharge groove 25. However, separate by-pass pumps are preferred because the energy consumed is less. This is attributable to the fact that the discharge pressure of the pump is higher than that required in motor working chambers 49, 51 and 51′. Consequently a portion of the energy expended in producing this high pressure is wasted when the pressure of the fluid bled from groove 25 is reduced to a suitable value. In the case of the separate by-pass pumps, fluid pressure is generated only at that pressure at which it is to be used.

As stated previously, the drawings and description relate only to a preferred embodiment of the invention. Since many changes can be made in this embodiment without departing from the inventive concept, and since the invention has utility in engines other than the one specifically disclosed, the following claims should provide the sole measure of the scope of the invention.

What is claimed is:

1. An engine comprising a housing containing an inlet passage and a discharge passage; a cylinder bore formed in the housing; a piston reciprocable in the bore and defining therewith a working chamber; means associated with the piston for reciprocating it; a distributing valve controlling communication between the working chamber and the inlet and discharge passages and being reciprocable between first and second positions in which it connects the working chamber with the inlet passage and the discharge passage, respectively, said valve in shifting from the first to the second position closes progressively the connection between the working chamber and the inlet passage and then opens progressively the connection between this chamber and the discharge passage; actuating means connected with the valve for reciprocating it in timed relation to the reciprocation of the piston; and override means associated with the valve and the actuating means for selectively maintaining the valve in the first position for a period of time whose length varies progressively between limits corresponding to minimum and maximum portions of the discharge stroke of the piston, and for simultaneously varying in inverse relation to the length of said period the distance the valve is shifted from its first position by the actuating means after said period has terminated.

2. An engine comprising a housing containing an inlet passage and a discharge passage; a cylinder bore formed in the housing; a piston reciprocable in the bore and defining therewith an engine working chamber; means associated with the piston for reciprocating it; a distributing valve controlling communication between the engine working chamber and the inlet and discharge passages and being shiftable between first and second positions in which it connects the engine working chamber with the inlet passage and with the discharge passage, respectively, said valve in shifting from the first to the second position closes progressively the connection between the engine working chamber and the inlet passage and then opens progressively the connection between this chamber and the discharge passage; first and second fluid pressure motors, each having a movable element and a working chamber, the movable elements acting on the distributing valve in opposing relationship; a spring acting on the distributing valve in aid of the second fluid pressure motor for biasing the valve toward its second position; an abutment located in the first motor working chamber and movable into contact with the movable element of the first motor; means associated with the abutment and with the means for reciprocating the piston for moving the abutment into contact with the movable element of the first motor for shifting the valve toward its first position in timed relation to the movement of the engine piston; and means associated with the two motor working chambers for varying in reverse senses the pressures in these chambers.

3. An engine comprising a housing containing an inlet passage and a discharge passage; a cylinder bore formed in the housing; a piston reciprocable in the bore and defining therewith an engine working chamber; means associated with the piston for reciprocating it; a distributing valve controlling communication between the engine working chamber and the inlet and discharge passages and being shiftable between first and second positions in which it connects the engine working chamber with the inlet passage and with the discharge passage, respectively, said valve in shifting from the first to the second position closes progressively the connection between the engine working chamber and the inlet passage and then opens progressively the connection between this chamber and the discharge passage; a motor cylinder bore; a piston and a plunger reciprocable in the bore, the cylinder bore and the adjacent ends of the piston and plunger defining a motor working chamber; means connecting the motor piston with the distributing valve for shifting the valve towards its first position; means biasing the piston and the plunger into abutting engagement and for reciprocating them in timed relation to the reciprocation of the engine piston; and means associated with the motor working chamber for varying the pressure in that chamber, whereby as the pressure in this chamber increases the engine working chamber is in communication with the inlet passage for an increasingly greater portion of the cycle of the engine piston.

4. An engine comprising a housing containing an inlet passage and a discharge passage; a cylinder bore formed in the housing; a piston reciprocable in the bore and defining therewith an engine working chamber; means associated with the piston for reciprocating it; a distributing valve controlling communication between the engine working chamber and the inlet and discharge passages and being shiftable between first and second positions in which it connects the engine working chamber with the inlet passage and with the discharge passage, respectively, said valve in shifting from the first to the second position closes progressively the connection between the engine working chamber and the inlet passage and then opens progressively the connection between this chamber and the discharge passage; a motor cylinder bore; a piston and a plunger reciprocable in the motor cylinder bore, the bore and the adjacent ends of the piston and plunger defining a motor working chamber; means connecting the motor piston with the distributing valve for shifting the valve toward its first position; a spring biasing the distributing valve toward its second position; a second fluid pressure motor having a working chamber and a movable element connected with the distributing valve for shifting same toward its second position; means associated with the plunger and the means for reciprocating the piston, and including the biasing spring, for reciprocating the plunger and the distributing valve in timed relation to the reciprocation of the engine piston, but 90° out of phase with it; first and second control passages connected with the working chambers of the first and second motors, respectively; restricted passages, one connecting each control passage with the inlet passage; a source of control pressure; and a control valve shiftable in opposite directions from a mid position in which both control passages are connected with the source of control pressure to graduate in reverse senses the connections between the source of control pressure and the two control passages.

5. An engine comprising a housing containing an inlet passage and a discharge passage; a cylinder block located in the housing and formed with two coaxial circular series of cylinder bores, there being the same number of bores in each series; an engine piston reciprocable in each bore of one of said series, each piston and its cylinder bore defining an engine working chamber; a main swash plate associated with the engine pistons for moving them on their discharge strokes; means associated with the engine pistons for moving them on their suction strokes; distributing valves, one associated with each engine working chamber, each valve being shiftable between first and second positions in which it connects the associated engine working chamber with the inlet passage and with the discharge passage, respectively, said valve in shifting from the first to the second position closes progressively the connection between the engine working chamber and the inlet passage and then opens progressively the connection between this chamber and the discharge passage; a valve plunger reciprocable in each bore of the other of said series; motor pistons, one reciprocable in each valve plunger cylinder bore and connected with each distributing valve for moving the valve toward its first position, the bores and the adjacent ends of aligned plungers and pistons defining first motor working chambers; springs, one biasing each motor piston into abutment with its associated valve plunger; an auxiliary swash plate engaging the valve plungers and rotatable with and about the same axis as the main swash plate, the auxiliary swash plate cooperating with the resilient biasing means to reciprocate each distributing valve in timed relation to the reciprocation of its associated engine piston, whereby as the engine piston moves on its inlet stroke and discharge stroke the distributing valve connects the engine working chamber with the inlet passage and with the discharge passage, respectively; second fluid motors, one associated with each distributing valve and each having a working chamber and a movable motor element connected with a distributing valve for moving the valve toward its second position; and control means associated with the first and second motors for varying in reverse senses the pressures in the working chambers of these motors.

6. The engine defined in claim 5 in which the rate of one of the biasing springs is higher than the rate of the others.

7. The engine defined in claim 5 in which the control means comprises first and second control passages communicating with the first and second motor working chambers, respectively; a restricted passage venting each control passage; a source of control pressure; a control valve regulating communication between the control passages and the source and being shiftable in opposite directions from a neutral position in which it connects both control passages with the source of control pressure to graduate in reverse senses the connections between the source of control pressure and the two control passages; resilient means biasing the control valve away from its neutral position in one direction; and a fluid pressure control motor connected with the control valve for shifting it in the opposite direction against the bias of the resilient means.

8. The engine defined in claim 7 in which the inlet passage is a low pressure passage and the discharge passage is a high pressure passage; and in which the fluid pressure control motor is in communication with the discharge passage.

9. An engine comprising a housing containing an inlet passage and a discharge passage; a cylinder block located in the housing and having an axial bore and two end faces; a circular series of longitudinal cylinder bores extending into the block from each end face, the bores of the two series being aligned and each bore having a closed inner end; an engine piston reciprocable in each cylinder bore and defining with the closed end thereof an engine working chamber; a drive shaft extending through the axial bore and journalled in the housing on opposite sides of the cylinder block; two main swash plates connected in driven relation with the drive shaft, one being located on each side of the cylinder block for actuating each series of engine pistons, the faces of the two swash plates lying in parallel planes; a piston plunger bore aligned with and connecting each pair of aligned cylinder bores; a piston plunger extending between the engine pistons in each aligned pair and reciprocable in the piston plunger bore, the length of each piston plunger being such as to maintain the engine pistons in operative engagement with their respetive swash plates; distributing valves, one associated with each engine working chamber and each shiftable between first and second positions in which it connects the associated engine working chamber with the inlet passage and the discharge passage, respectively, each valve in shifting from the first to the second position closes progressively the connection between the associated working chamber and the inlet passage and then opens progressively the connection between this chamber and the discharge passage; resilient means biasing each valve toward one of said positions, all valves associated with working chambers in the same series being biased toward the same position; a circular series of longitudinal valve plunger bores extending into the cylinder block from each end face, each series being coaxial with and containing the same number of bores as each series of longitudinal cylinder bores; valve plungers, one reciprocable in each valve plunger bore and operatively connected with each distributing valve for shifting the valve toward its other position against the bias of the resilient means; and two auxiliary swash plates connected in driven relation with the drive shaft, one being located on each side of the cylinder block for actuating each series of valve plungers, the auxiliary swash plates and valve plunger bores being so arranged relatively to the main swash plates and cylinder bores that the oscillation of each distributing valve is 90° out of phase with the reciprocation of its associated engine piston and that when an engine piston moves on its inlet and discharge strokes the associated distributing valve connects the working chamber with the inlet passage and the discharge passage, respectively.

10. An engine comprising a housing containing an inlet passage and a discharge passage; a cylinder block located in the housing and having an axial bore and two end faces; a circular series of longitudinal cylinder bores extending into the block from each end face, the bores of the two series being aligned and each bore having a closed inner end; an engine piston reciprocable in each cylinder bore and defining with the closed end thereof an engine working chamber; a drive shaft extending through the axial bore and journalled in the housing on opposite sides of the cylinder block; two main swash plates connected in driven relation with the drive shaft, one being located on each side of the cylinder block for actuating each series of engine pistons, the faces of the two swash plates lying in parallel planes; a piston plunger bore aligned with and connecting each pair of aligned cylinder bores; a piston plunger extending between the engine pistons in each aligned pair and reciprocable in the piston plunger bore, the length of each piston plunger being such as to maintain the engine pistons in operative engagement with their respective swash plates; distributing valves, one associated with each engine working chamber and each shiftable between first and second positions in which it connects the associated engine working chamber with the inlet passage and the discharge passage, respectively, each valve in shifting from the first to the second position closes progressively the connection between the associated working chamber and the inlet passage and then opens progressively the connection between this chamber and the discharge passage; springs biasing the distributing valves toward their second positions; a circular series of longitudinal valve plunger bores extending into the cylinder block from each end face, each series being coaxial with and containing the same number of bores as each series of longitudinal cylinder bores; valve plungers, one reciprocable in each valve plunger bore; valve pistons, one reciprocable in each valve plunger bore and operatively connected with each distributing valve for shifting the valve toward its first position, the valve plunger bores and the adjacent ends of aligned valve pistons and plungers defining first motor working chambers; a second set of fluid pressure motors, each having a working chamber and a movable element connected with a distributing valve for moving the valve toward its second position; two auxiliary swash plates connected in driven relation with the drive shaft, one being located on each side of the cylinder block for actuating each series of valve plungers, the auxiliary swash plates and valve plunger bores being so arranged relatively to the main swash plates and cylinder bores that the oscillation of each distributing valve is 90° out of phase with the reciprocation of its associated engine piston and that when an engine piston moves on its inlet and discharge strokes the associated distributing valve connects the working chamber with the inlet passage and the discharge passage, respectively; and control means associated with the first and second motors for varying in reverse senses the pressures in the working chambers of these motors.

11. The engine defined in claim 10 in which the control means comprises first and second control passages communicating with the first and second motor working chambers, respectively; a restricted passage venting each control passage; a source of control pressure; a control valve regulating communication between the control passages and the source and being shiftable in opposite directions from a neutral position in which it connects both control passages with the source of control pressure to graduate in reverse senses the connections between the source of control pressure and the two control passages; resilient means biasing the control valve away from its neutral position in one direction; and a fluid pressure control motor connected with the control valve for shifting it in the opposite direction against the bias of the resilient means.

12. The engine defined in claim 11 in which the inlet passage is a low pressure passage and the discharge passage is a high pressure passage; and in which the fluid pressure control motor is in communication with the discharge passage.

13. The engine defined in claim 12 in which the rate of one of the distributing valve biasing springs is higher than the rate of the others.

References Cited in the file of this patent

UNITED STATES PATENTS

| | | |
|---|---|---|
| 520,757 | Gourley | May 29, 1894 |
| 1,062,377 | Woerner | May 20, 1913 |
| 1,460,824 | Parsons | July 3, 1923 |
| 2,690,133 | Dodge | Sept. 28, 1954 |
| 2,709,422 | Bray | May 31, 1955 |
| 2,844,002 | Pavesi | July 22, 1958 |

FOREIGN PATENTS

| | | |
|---|---|---|
| 791,604 | Great Britain | Mar. 5, 1958 |